(12) United States Patent
Yao et al.

(10) Patent No.: US 11,716,646 B2
(45) Date of Patent: Aug. 1, 2023

(54) PERFORMANCE MEASUREMENTS FOR 5GC NETWORK FUNCTIONS

(71) Applicant: Apple Inc., Cupertino, CA (US)

(72) Inventors: Yizhi Yao, Chandler, AZ (US); Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 17/267,089

(22) PCT Filed: Aug. 8, 2019

(86) PCT No.: PCT/US2019/045718
§ 371 (c)(1),
(2) Date: Feb. 9, 2021

(87) PCT Pub. No.: WO2020/033697
PCT Pub. Date: Feb. 13, 2020

(65) Prior Publication Data
US 2021/0168643 A1    Jun. 3, 2021

Related U.S. Application Data

(60) Provisional application No. 62/716,442, filed on Aug. 9, 2018.

(51) Int. Cl.
*H04W 24/10* (2009.01)
*H04W 8/02* (2009.01)
(Continued)

(52) U.S. Cl.
CPC ............. *H04W 24/10* (2013.01); *H04W 8/02* (2013.01); *H04W 60/02* (2013.01); *H04W 84/042* (2013.01)

(58) Field of Classification Search
CPC ... H04W 36/028; H04W 36/30; H04W 16/18; H04W 76/18; H04W 28/0273; H04W 14/0816; G06F 16/2457
(Continued)

(56) References Cited

U.S. PATENT DOCUMENTS 9,479,564 B2 * 10/2016 Jenkins ................... H04L 67/02
9,706,575 B2 *  7/2017 Mawlawi .......... H04W 74/0816
(Continued)

FOREIGN PATENT DOCUMENTS

CN     101969662 B  *  4/2015
CN     101969662 B1 *  4/2015
(Continued)

OTHER PUBLICATIONS

E. Pateromichelakis et al., "End-to-End Data Analytics Framework for 5G Architecture," in IEEE Access, vol. 7, pp. 40295-40312, 2019, doi: 10.1109/ACCESS.2019.2902984. (Year: 2019).*
(Continued)

*Primary Examiner* — William D Cumming
(74) *Attorney, Agent, or Firm* — Eschweiler & Potashnik, LLC (57) ABSTRACT

A network management system can monitor and process raw measurements of network functions (NFs). The NFs are coupled to one another via service based interfaces in a 5G network core (5GC) of a 5G network system (5GS). A server producer generates performance measurements corresponding to the one or more NFs based on the raw measurements. The performance measurements are used to evaluate and optimize the performance related to network services enablement, mobility tracking and reachability with a user equipment (UE) or the gNB according to an Access Mobility Function (AMF) component, a Session Management Function (SMF) component, a Policy Control Function (PCF)
(Continued)

component, a Network Exposure Function (NEF) component, or a Network Function Repository Function (NRF) component, as well as associated performance parameters or measurements disclosed.

18 Claims, 5 Drawing Sheets

(51) Int. Cl.
   *H04W 60/02* (2009.01)
   *H04W 84/04* (2009.01)
(58) Field of Classification Search
   USPC .......................................................... 709/217
   See application file for complete search history.

(56) References Cited

U.S. PATENT DOCUMENTS

| | | | |
|---|---|---|---|
| 10,749,639 B2 * | 8/2020 | Jheng | H04L 1/1861 |
| 2015/0365462 A1 * | 12/2015 | Jenkins | G06F 16/957 |
| | | | 709/217 |
| 2016/0364724 A1 * | 12/2016 | Wang | G06Q 20/405 |
| 2017/0272354 A1 | 9/2017 | Chen | |
| 2018/0213456 A1 * | 7/2018 | Jheng | H04W 28/0273 |
| 2018/0307723 A1 * | 10/2018 | Bhargava | G06F 16/2457 |
| 2021/0120473 A1 * | 4/2021 | Yao | H04W 36/30 |
| 2021/0125179 A1 * | 4/2021 | Mach | G06Q 20/401 |
| 2021/0168643 A1 * | 6/2021 | Yao | H04L 41/5019 |
| 2021/0392519 A1 * | 12/2021 | Yao | H04W 76/18 |

FOREIGN PATENT DOCUMENTS

| | | | | |
|---|---|---|---|---|
| CN | 112544055 A * | 3/2021 | ............. | H04L 12/14 |
| EP | 0985285 B1 * | 6/2006 | | |
| EP | 2515500 A1 * | 10/2012 | ............. | G06F 21/32 |
| EP | 3340535 A1 | 6/2018 | | |
| JP | 2018029344 A | 2/2018 | | |
| KR | 101284677 B1 * | 7/2013 | | |
| WO | 2016/114866 A1 | 7/2016 | | |
| WO | 2016/115900 A1 | 7/2016 | | |
| WO | 2017/222613 A1 | 12/2017 | | |
| WO | 2018/022951 A2 | 2/2018 | | |
| WO | 2018/098790 A1 | 7/2018 | | |
| WO | WO-2020033697 A1 * | 2/2020 | ............. | H04L 12/14 |

OTHER PUBLICATIONS

R. Mohamed, S. Zemouri and C. Verikoukis, "Performance Evaluation and Comparison between SA and NSA 5G Networks in Indoor Environment," 2021 IEEE International Mediterranean Conference on Communications and Networking (MeditCom), Athens, Greece, 2021, pp. 112-116 (Year: 2021).*

International Preliminary Report on Patentability dated Feb. 19, 2021 for International Application No. PCT/US2019/045718.

International Search Report dated Nov. 28, 2019 for International Application No. PCT/US2019/045718.

3rd Generation Partnership Project; Technical Specification Group Services and System Aspects; Management and orchestration; Performance orchestration (Release 15). 3GPP TS 28.550 V15.0.0 (Dec. 2018).

3rd Generation Partnership Project; Technical Specification Group Services and System Aspects; Management and orchestration; 5G performance measurements (Release 15). 3GPP TS 28.552 V15.0.0 (Sep. 2018).

3rd Generation Partnership Project; Technical Specification Group Services and System Aspects; System Architecture for the 5G System; Stage 2 (Release 15). 3GPP TS 23.501 V15.6.0 (Jun. 2019).

3rd Generation Partnership Project; Technical Specification Group Services and System Aspects; Procedures for the 5G System; Stage 2 (Release 15). 3GPP TS 23.502 V15.3.0 (Sep. 2018).

Nokia; "New WID on management data definitions for 5G network functions"; 3GPP TSG|WG-5 Meeting #115; S5-175190; Oct. 16, 2017.

* cited by examiner

PERFORMANCE MEASUREMENTS FOR 5GC NETWORK FUNCTIONS

REFERENCE TO RELATED APPLICATIONS

This application is a National Phase entry application of International Patent Application No. PCT/US2019/045718 filed Aug. 8, 2019, which claims priority to U.S. Provisional Application 62/716,442 filed on Aug. 9, 2018, entitled "PERFORMANCE MEASUREMENTS FOR 5GC NETWORK FUNCTIONS" and is hereby incorporated by reference in its entirety.

FIELD

The present disclosure relates to wireless technology, and more specifically to performance measurements for 5G Core Network (5GC) network functions.

BACKGROUND 5G networks and network slicing are designed to support enhanced Mobile Broadband (eMBB), Ultra-Reliable Low Latency communication (URLLC), and mobile Internet of Things (mIoT) services. Some services have ultra-low latency, high data capacity, and strict reliability requirements where faults or performance issues in the networks can cause service failure. Therefore, collection of real-time performance data or performance measurements that can be used by analytic applications (e.g., network optimization, Self-Organizing Network (SON), etc.) to detect the potential issues in advance, and take appropriate actions to prevent or mitigate the issues. Also, the performance data may be able to be consumed by multiple analytic applications with specific purposes. The 5G services (e.g., eMBB, URLLC, mIoT, and/or other like services) may have requirements for end-to end (e2e) performance of the 5G networks. Therefore, e2e performance measurements need to be defined for 5G networks.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

5G networks and network slicing are designed to support eMBB, URLLC, and mIoT services. Some services have ultra-low latency, high data capacity, and strict reliability requirements where faults or performance issues in the networks can cause service failure. Therefore, collection of real-time performance data and/or performance measurements that can be used by analytic applications (e.g., network optimization, self-organizing networks (SON)s, etc.) to detect the potential issues in advance, and take appropriate actions to prevent or mitigate the issues. Also, the performance data can be able to be consumed by multiple analytic applications with specific purposes. The fifth generation (5G) services (e.g., eMBB, URLLC, mIoT, or other like services) can have requirements for end-to-end (e2e) performance of the 5G networks. Therefore, e2e performance measurements have a need to be defined for 5G networks, especially in alignment with 3GPP standards (e.g., TS 23.501, TS 28.550, or TS 28.552) in Release 16 or beyond.

In particular, performance measurements for 5G NFs (including 5GC) can need to be collected according to defined use cases and requirements so that the performance of the 5G NFs (including 5GC NFs) can be monitored. Examples of 5G NFs are shown by FIGS. 1A and 1B, demonstrates example 5G cores 101 and 102.

Figure 1A:
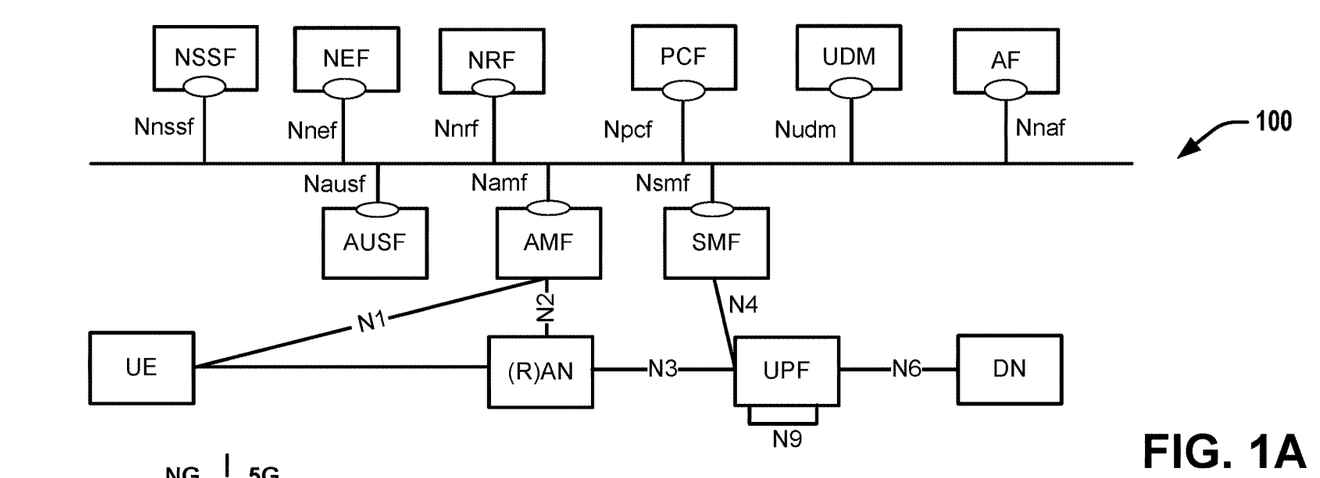
FIGS. 1A and 1B illustrate block diagrams of network function components (NFs) and interfaces in connection with embodiments/aspects described herein.
Figure 1B:
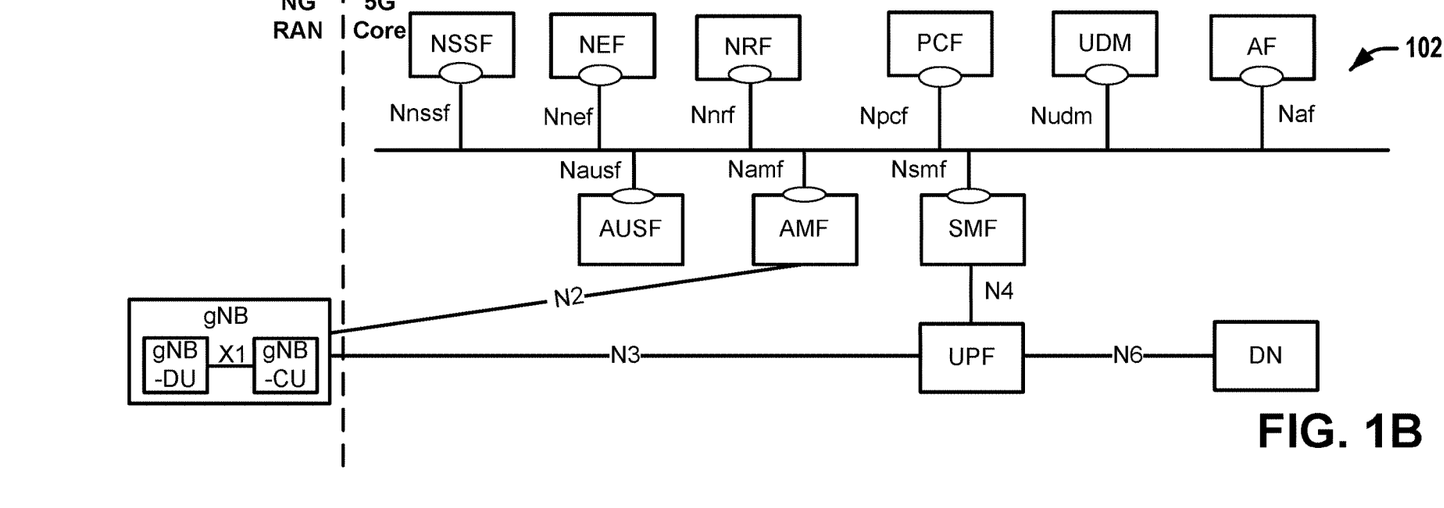
Figure 2:
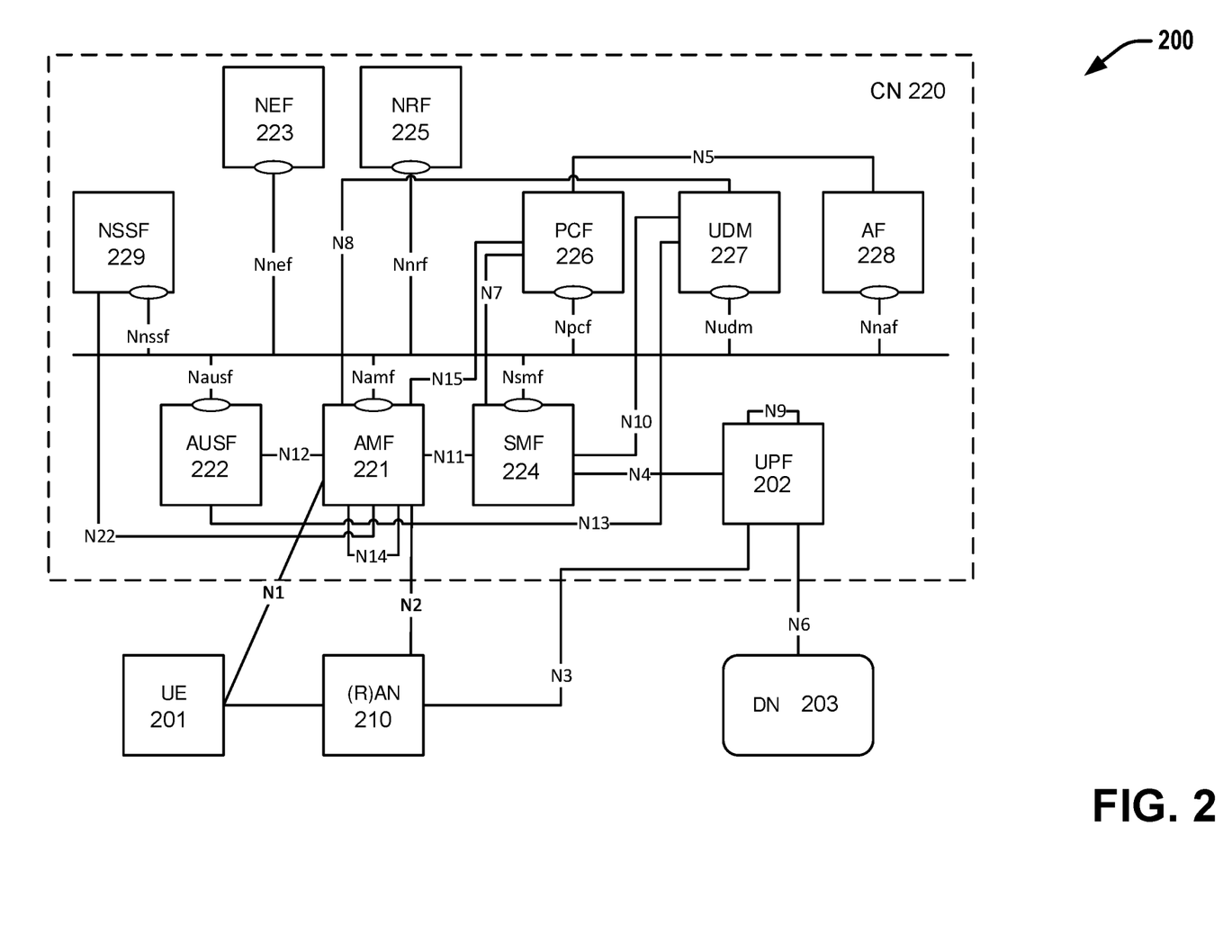
FIG. 2 is another block diagram illustrating another example of network function components (NFs) and interfaces that can be employed in accordance with various aspects described herein.

A more detailed description of the NFs and interfaces between the NFs depicted by FIGS. 1A and 1B is provided with respect to FIG. 2 infra. In the 5G network architecture of FIG. 1B, an NG-RAN comprises a functional split feature that splits a gNB (also referred to as an "NG RAN," "NG RAN node," or the like) into gNB-Centralized Unit (CU) that implements the upper layer of gNB function and gNB-Distributed Unit (DU) that implements the lower layer gNB function. The 5G core NFs and gNB-CU can be implemented as Virtualized Network Functions (VNFs), and the gNB and/or gNB-DU can be implemented as Physical Network Function(s) (PNF(s)). An Operator can create a virtualized 5G networks by using ETSI NFV lifecycle management function to instantiate a Network Service (NS) in the cloud that includes various VNFs (e.g., 5G core NFs, gNB-CU), PNFs (e.g. gNB-DU), and VNF Forwarding Graph(s) (VNFFG(s)).

However, the performance measurements for 5GC NFs defined in the current specifications can be limited and not entirely sufficient for network monitoring (e.g., the performance of the 5G core network (5GC)), authentication of UEs with gNBs, or to enable registration of a UE with the 5G system (5GS). Embodiments herein provide mechanisms to generate the performance measurements for 5GC NFs (including, e.g., Access and Mobility Function (AMF), a Session Management Function (SMF), a User Plane Function (UPF), a Policy Control Function (PCF), a Network Exposure Function (NEF), a Network Function Repository Function (NRF), or other 5GC NFs, which can each have associated components including one or more processors/processing devices for performing operations of the associated function. The performance measurements for 5GC NFs are the fundamental data for monitoring the performance of 5GC, and can include network parameters or data associated with particular operations, including, but not limited to: Initial Registration to the 5GS; Mobility Registration Update (upon changing to a new Tracking Area (TA) outside the UE's Registration Area in both connection management (CM)-CONNECTED and CM-IDLE state, or when the UE needs to update its capabilities or protocol parameters that are negotiated in Registration procedure with or without changing to a new TA); Periodic Registration Update (due to a predefined time period of inactivity); and Emergency Registration (i.e. the UE is in limited service state).

FIG. 2 illustrates an architecture of a system 200 including a second CN 220 in accordance with various embodiments. The system 200 is shown to include a user equipment (UE) 201, which can be the same or similar to other UEs discussed herein; a radio access network (R)AN 210 or access node (AN); and a data network (DN) 203, which can be, for example, operator services, Internet access or 3rd party services; and a 5GC 220. The 5GC 220 can include an Authentication Server Function (AUSF) 222; an AMF 221; a SMF 224; a NEF 223; a PCF 226; a NRF 225; a Unified Data Management (UDM) 227; an application function (AF) 228; a user plane function (UPF) 202; and a NSSF 229, each with respective components for processing corresponding 5GC network functions (NFs).

The UPF 202 can act as an anchor point for intra-RAT and inter-RAT mobility, an external protocol data unit (PDU) session point of interconnect to DN 203, and a branching point to support multi-homed PDU session. The UPF 202 can also perform packet routing and forwarding, perform packet inspection, enforce the user plane part of policy rules, lawfully intercept packets (UP collection), perform traffic usage reporting, perform QoS handling for a user plane (e.g., packet filtering, gating, uplink (UL)/downlink (DL) rate enforcement), perform Uplink Traffic verification (e.g., Service Data Flow (SDF) to Quality of Service (QoS) flow mapping), transport level packet marking in the uplink and downlink, and perform downlink packet buffering and downlink data notification triggering. UPF 202 can include an uplink classifier to support routing traffic flows to a data network. The DN 203 can represent various network operator services, Internet access, or third party services. DN 203 can include, or be similar to, application server XQ30 discussed previously. The UPF 202 can interact with the SMF 224 via an N4 reference point between the SMF 224 and the UPF 202.

The AUSF 222 can store data for authentication of UE 201 and handle authentication-related functionality. The AUSF 222 can facilitate a common authentication framework for various access types. The AUSF 222 can communicate with the AMF 221 via an N12 reference point between the AMF 221 and the AUSF 222; and can communicate with the UDM 227 via an N13 reference point between the UDM 227 and the AUSF 222. Additionally, the AUSF 222 can exhibit an Nausf service-based interface.

The AMF 221 can be responsible for registration management (e.g., for registering UE 201, etc.), connection management, reachability management, mobility management, and lawful interception of AMF-related events, and access authentication and authorization. The AMF 221 can be a termination point for the an N11 reference point between the AMF 221 and the SMF 224. The AMF 221 can provide transport for SM messages between the UE 201 and the SMF 224, and act as a transparent proxy for routing SM messages. AMF 221 can also provide transport for SMS messages between UE 201 and a Short Message Service (SMS) function (SMSF) (not shown by FIG. 2). AMF 221 can act as Security Anchor Function (SEAF), which can include interaction with the AUSF 222 and the UE 201, receipt of an intermediate key that was established as a result of the UE 201 authentication process. Where Universal Subscriber Identity Module (USIM) based authentication is used, the AMF 221 can retrieve the security material from the AUSF 222. AMF 221 can also include a Security Context Management (SCM) function, which receives a key from the SEAF that it uses to derive access-network specific keys. Furthermore, AMF 221 can be a termination point of a RAN CP interface or RAN connection point interface, which can include or be an N2 reference point between the (R)AN 210 and the AMF 221; and the AMF 221 can be a termination point of Non Access Stratum (NAS) layer (N1) signalling, and perform NAS ciphering and integrity protection.

AMF 221 can also support NAS signalling with a UE 201 over an N3 Interworking Function (IWF) interface. The N3 IWF can be used to provide access to untrusted entities. N3IWF can be a termination point for the N2 interface between the (R)AN 210 and the AMF 221 for the control plane, and can be a termination point for the N3 reference point between the (R)AN 210 and the UPF 202 for the user plane. As such, the AMF 221 can handle N2 signalling from the SMF 224 and the AMF 221 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signalling between the UE 201 and AMF 221 via an N1 reference point between the UE 201 and the AMF 221, and relay uplink and downlink user-plane packets between the UE 201 and UPF 202. The N3IWF also provides mechanisms for IPsec tunnel establishment with the UE 201. The AMF 221 can exhibit an Namf service-based interface, and can be a termination point for an N14 reference point between two AMFs 221 and an N17 reference point between the AMF 221 and a 5G-Equipment Identity Register (EIR) (not shown by FIG. 2).

The UE 201 can need to register with the AMF 221 in order to receive network services. Registration Management (RM) is used to register or deregister the UE 201 with the network (e.g., AMF 221), and establish a UE context in the network (e.g., AMF 221). The UE 201 can operate in an RM-REGISTERED state or an RM-DEREGISTERED state. In the RM-DEREGISTERED state, the UE 201 is not registered with the network, and the UE context in AMF 221 holds no valid location or routing information for the UE 201 so the UE 201 is not reachable by the AMF 221. In the RM-REGISTERED state, the UE 201 is registered with the network, and the UE context in AMF 221 can hold a valid location or routing information for the UE 201 so the UE 201 is reachable by the AMF 221. In the RM-REGISTERED state, the UE 201 can perform mobility Registration Update procedures, perform periodic Registration Update procedures triggered by expiration of the periodic update timer (e.g., to notify the network that the UE 201 is still active), and perform a Registration Update procedure to update UE capability information or to re-negotiate protocol parameters with the network, among others.

The AMF 221 can store one or more RM contexts for the UE 201, where each RM context is associated with a specific access to the network. The RM context can be a data structure, database object, etc. that indicates or stores, inter alia, a registration state per access type and the periodic update timer. The AMF 221 can also store a 5GC MM context that can be the same or similar to the (E)MM context discussed previously. In various embodiments, the AMF 221 can store a CE mode B Restriction parameter of the UE 201 in an associated MM context or RM context. The AMF 221 can also derive the value, when needed, from the UE's usage setting parameter already stored in the UE context (and/or MM/RM context).

Connection Management (CM) can be used to establish and release a signaling connection between the UE 201 and the AMF 221 over the N1 interface. The signaling connection is used to enable NAS signaling exchange between the UE 201 and the CN 220, and comprises both the signaling connection between the UE and the Access Network (AN) (e.g., Radio Resource Control (RRC) connection or UE-N3IWF connection for non-3GPP access) and the N2 connection for the UE 201 between the AN (e.g., RAN 210) and the AMF 221. The UE 201 can operate in one of two CM states, CM-IDLE mode or CM-CONNECTED mode. When the UE 201 is operating in the CM-IDLE state/mode, the UE 201 can have no NAS signaling connection established with the AMF 221 over the N1 interface, and there can be (R)AN 210 signaling connection (e.g., N2 and/or N3 connections) for the UE 201. When the UE 201 is operating in the CM-CONNECTED state/mode, the UE 201 can have an established NAS signaling connection with the AMF 221 over the N1 interface, and there can be a (R)AN 210 signaling connection (e.g., N2 and/or N3 connections) for the UE 201. Establishment of an N2 connection between the (R)AN 210 and the AMF 221 can cause the UE 201 to transition from CM-IDLE mode to CM-CONNECTED mode, and the UE 201 can transition from the CM-CONNECTED mode to the CM-IDLE mode when N2 signaling between the (R)AN 210 and the AMF 221 is released.

The SMF 224 can be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM can refer to management of a PDU session, and a PDU session or "session" can refer to a PDU connectivity service that provides or enables the exchange of PDUs between a UE 201 and a data network (DN) 203 identified by a Data Network Name (DNN). PDU sessions can be established upon UE 201 request, modified upon UE 201 and 5GC 220 request, and released upon UE 201 and 5GC 220 request using NAS SM signaling exchanged over the N1 reference point between the UE 201 and the SMF 224. Upon request from an application server, the 5GC 220 can trigger a specific application in the UE 201. In response to receipt of the trigger message, the UE 201 can pass the trigger message (or relevant parts/information of the trigger message) to one or more identified applications in the UE 201. The identified application(s) in the UE 201 can establish a PDU session to a specific DNN. The SMF 224 can check whether the UE 201 requests are compliant with user subscription information associated with the UE 201. In this regard, the SMF 224 can retrieve and/or request to receive update notifications on SMF 224 level subscription data from the UDM 227.

The SMF 224 can include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 224 can be included in the system 200, which can be between another SMF 224 in a visited network and the SMF 224 in the home network in roaming scenarios. Additionally, the SMF 224 can exhibit the Nsmf service-based interface.

The NEF 223 can provide means for securely exposing the services and capabilities provided by 3GPP network functions for third party, internal exposure/re-exposure, Application Functions (e.g., AF 228), edge computing or fog computing systems, etc. In such embodiments, the NEF 223 can authenticate, authorize, and/or throttle the AFs. NEF 223 can also translate information exchanged with the AF 228 and information exchanged with internal network functions. For example, the NEF 223 can translate between an AF-Service-Identifier and an internal 5GC information. NEF 223 can also receive information from other network functions (NFs) based on exposed capabilities of other network functions. This information can be stored at the NEF 223 as structured data, or at a data storage NF using standardized interfaces. The stored information can then be re-exposed by the NEF 223 to other NFs and AFs, and/or used for other purposes such as analytics. Additionally, the NEF 223 can exhibit an Nnef service-based interface.

The NRF 225 can support service discovery functions, receive NF discovery requests from NF instances, and provide the information of the discovered NF instances to the NF instances. NRF 225 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 225 can exhibit the Nnrf service-based interface.

The PCF 226 can provide policy rules to control plane function(s) to enforce them, and can also support unified policy framework to govern network behaviour. The PCF 226 can also implement a front end (FE) to access subscription information relevant for policy decisions in a Uniform Data Repository (UDR) or user datagram protocol of the UDM 227. The PCF 226 can communicate with the AMF 221 via an N15 reference point between the PCF 226 and the AMF 221, which can include a PCF 226 in a visited network and the AMF 221 in case of roaming scenarios. The PCF 226 can communicate with the application function AF 228 via an N5 reference point between the PCF 226 and the AF 228; and with the SMF 224 via an N7 reference point between the PCF 226 and the SMF 224. The system 200 and/or CN 220 can also include an N24 reference point between the PCF 226 (in the home network) and a PCF 226 in a visited network. Additionally, the PCF 226 can exhibit an Npcf service-based interface.

The UDM 227 can handle subscription-related information to support the network entities' handling of communication sessions, and can store subscription data of UE 201. For example, subscription data can be communicated between the UDM 227 and the AMF 221 via an N8 reference point between the UDM 227 and the AMF. The UDM 227 can include two parts, an application FE and a Uniform Data Repository (UDR) (the FE and UDR are not shown by FIG. 2). The UDR can store subscription data and policy data for the UDM 227 and the PCF 226, and/or structured data for exposure and application data (including PFDs for application detection, application request information for multiple UEs 201) for the NEF 223. The Nudr service-based interface can be exhibited by the UDR to allow the UDM 227, PCF 226, and NEF 223 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different front ends can serve the same user in different transactions. The UDM-FE accesses subscription information stored in the UDR and performs authentication credential processing, user identification handling, access authorization, registration/mobility management, and subscription management. The UDR can interact with the SMF 224 via an N10 reference point between the UDM 227 and the SMF 224. UDM 227 can also support SMS management, wherein an SMS-FE implements the similar application logic as discussed previously. Additionally, the UDM 227 can exhibit the Nudm service-based interface.

The AF 228 can provide application influence on traffic routing, provide access to the NCE, and interact with the policy framework for policy control. The NCE can be a mechanism that allows the 5GC 220 and AF 228 to provide information to each other via NEF 223, which can be used for edge computing implementations. In such implementations, the network operator and third party services can be hosted close to the UE 201 access point of attachment to achieve an efficient service delivery through the reduced end-to-end latency and load on the transport network. For edge computing implementations, the 5GC can select a UPF 202 close to the UE 201 and execute traffic steering from the UPF 202 to DN 203 via the N6 interface. This can be based on the UE subscription data, UE location, and information provided by the AF 228. In this way, the AF 228 can influence UPF (re)selection and traffic routing. Based on operator deployment, when AF 228 is considered to be a trusted entity, the network operator can permit AF 228 to interact directly with relevant NFs. Additionally, the AF 228 can exhibit an Naf service-based interface.

The NSSF 229 can select a set of network slice instances serving the UE 201. The NSSF 229 can also determine allowed NSSAI and the mapping to the subscribed single Network Slice Selection Assistance Information (S-NSSAIs), if needed. The NSSF 229 can also determine the AMF set to be used to serve the UE 201, or a list of candidate AMF(s) 221 based on a suitable configuration and possibly by querying the NRF 225. The selection of a set of network slice instances for the UE 201 can be triggered by the AMF 221 with which the UE 201 is registered by interacting with the NSSF 229, which can lead to a change of AMF 221. The NSSF 229 can interact with the AMF 221 via an N22 reference point between AMF 221 and NSSF 229; and can communicate with another NSSF 229 in a visited network via an N31 reference point (not shown by FIG. 2). Additionally, the NSSF 229 can exhibit an Nnssf service-based interface.

The CN 220 can include an SMSF, which can be responsible for SMS subscription checking and verification, and relaying SM messages to/from the UE 201 to/from other entities, such as an SMS-GMSC/IWMSC/SMS-router. The SMS can also interact with AMF 221 and UDM 227 for a notification procedure that the UE 201 is available for SMS transfer (e.g., set a UE not reachable flag, and notifying UDM 227 when UE 201 is available for SMS).

The CN 120 can also include other elements that are not shown by FIG. 2, such as a Data Storage system/architecture, a 5G-EIR, a SEPP, and the like. The Data Storage system can include a SDSF, an UDSF, and/or the like. Any NF can store and retrieve unstructured data into/from the UDSF (e.g., UE contexts), via N18 reference point between any NF and the UDSF (not shown by FIG. 2). Individual NFs can share a UDSF for storing their respective unstructured data or individual NFs can each have their own UDSF located at or near the individual NFs. Additionally, the UDSF can exhibit an Nudsf service-based interface (not shown by FIG. 2). The 5G-EIR can be an NF that checks the status of PEI for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 2 for clarity. In one example, the CN 220 can include an Nx interface, which is an inter-CN interface between the Mobility Management Entity (MME) and the AMF 221 in order to enable interworking between CN 220 and other CN. Other example interfaces/reference points can include an N5g-Equipment Identity Register (EIR) service-based interface exhibited by a 5G-EIR, an N27 reference point between the Network Repository Function (NRF) in the visited network and the NRF in the home network; and an N31 reference point between the NSSF in the visited network and the NSSF in the home network. Further, any of the above functions, entities, etc. can include or be comprised by a component as referred to herein.

Figure 3:
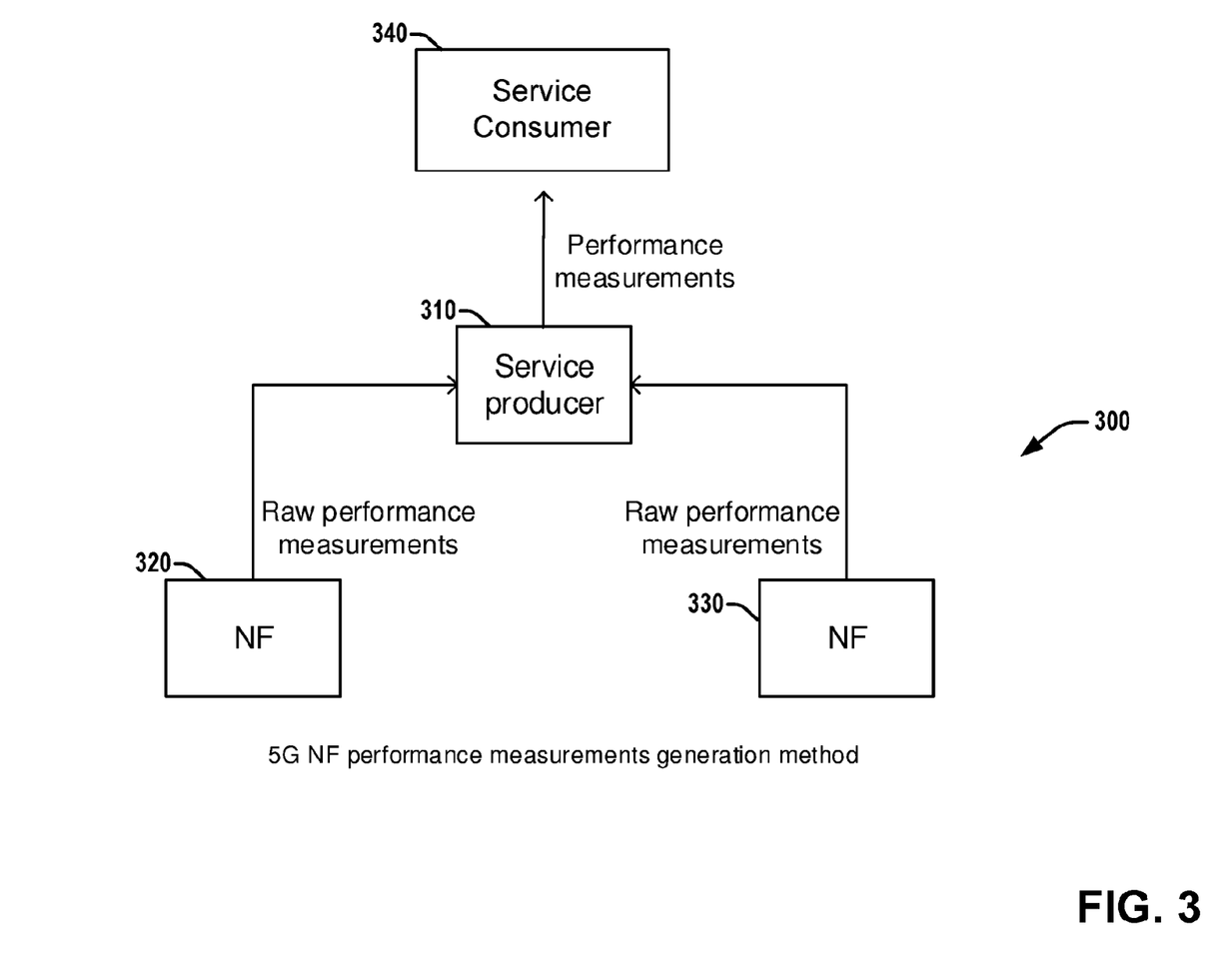
FIG. 3 is a diagram illustrating example interfaces of circuitry or service provider/producer components that can be employed in accordance with various aspects/embodiments described herein.

FIG. 3 illustrates an example performance measurement service producer/provider in accordance with various details, embodiments or aspects described herein. The service producer 310 collects raw performance measurements from one or more NFs 320, 330, as described herein and then generates performance measurements for corresponding NFs 320, 330 for its consumers or a service consumer 340 (e.g., a UE, gNB, or other network device/component).

Each NF 320, 330 is configured to determine, monitor, processor, transmit or perform raw measurements. Raw measurements are different from performance measurement in that they are different in a format, information, data, or otherwise than the performance measurement. A raw measurement can be a sensed or collected data, where a performance measurement is processed and provided in a set of information with meaning to a receiver. For example, a counter such as a cumulative counter can ascertain raw measurements of increments such as in integers or other value, and the performance data can provide this data meaning as a category, file or different format to a device for further processing or monitoring based thereon. Performance measurements can coincide or be referred to according to 3GPP standard performance measurements such as in TS 23.501, TS 28.550, or TS 28.552 in Release 16 or beyond. The NFs thus can provide measurements in a non-standardized manner or form so the provider 310 as an associated component can provide a standard measure or standard performance measure.

Although illustrated as one or more NFs 320, 330 communicatively coupled to or connected to the service provider 310, each can be comprised by the other and vice versa in location as corresponding components, and each NF can include one or more functions as provided here, such as by NFs for 5GC.

Various aspects or embodiments also include 5GC performance measurements and defining, indicating or setting these particular performance measurements for communication between a UE and gNB with a 5GC.

In one embodiment, these performance measurements can be related to use cases of registration related measurements. A UE needs to register with the 5GS to get authorization to receive services, to enable mobility tracking and to enable reachability. The following registration types are defined: Initial Registration to the 5GS; Mobility Registration Update (upon changing to a new Tracking Area (TA) outside the UE's Registration Area in both CM-CONNECTED and CM-IDLE state, or when the UE needs to update its capabilities or protocol parameters that are negotiated in Registration procedure with or without changing to a new TA); Periodic Registration Update (due to a predefined time period of inactivity); and Emergency Registration (i.e. the UE is in limited service state).

The performance of registration for each registration type needs to be monitored by the operator (UE, gNB, 5GC, service provider 310 or other device component) since it is relevant to whether the end user can use the service of 5GS or a specific network slice.

In an aspect, performance measurements and assurance data can be for the AMF. These can be registration types as follows: initial registration, mobility registration update, periodic registration update, and emergency registration, which can be monitored or determined for an end user. As such, the service provider can define two measurements for registration type: one is the requests "number of initial registration requests" and the other is the successful case "number of successful initial registrations".

The Number of initial registration requests provides or indicates the number of initial registration requests received by the AMF, and be measured by a cumulative counter (CC) at the NF 320, 330 (e.g., AMF 221) or provider 310. On receipt by the AMF from the UE 201 of Registration Request with the registration type can indicate an initial registration (see 3GPP TS 23.502 [x]). Each initial registration request is added to the relevant subcounter per Network Slice Instance (NSI) identifier of a Single Network Slice Selection Assistance Information (S-NSSAI). Each subcounter can be an integer value, and the measurement name can be as follows: RM.RegInitReq.SNSSAI, where SNSSAI identifies the NSI. This can be an AMF Function, valid for packet switched traffic in 5GC. A usage of this performance measurement is for performance assurance or assuring the performance at the component.

Another type performance measurement used in a registration procedure related measurement includes a Number of successful initial registrations. This measurement provides the number of successful initial registrations at the AMF. The data can be collected as a by a CC, on transmission by the AMF to the UE 201 of Registration Accept indicating an accepted initial registration (see 3GPP TS 23.502 [x]). Each accepted initial registration is added to the relevant subcounter per NSI identifier (S-NSSAI). Each related subcounter is an integer value, and can go by the measurement name: RM.RegInitSucc.SNSSAI, where SNSSAI identifies the NSI. This can be an AMF Function, valid for packet switched traffic in 5GC. A usage of this performance measurement is for performance assurance or assuring the performance at the component.

Another type performance measurement used in a registration procedure related measurement includes a Number of mobility registration update requests. This measurement provides the number of mobility registration update requests received by the AMF. The data can be collected as a by a CC, on receipt by the AMF from the UE 201 of Registration Request with the registration type indicating a Mobility Registration Update (see 3GPP TS 23.502 [x]). Each mobility registration update request is added to the relevant subcounter per NSI identifier (S-NSSAI). Each related subcounter is an integer value, and named as: RM.RegMobReq.SNSSAI, where SNSSAI identifies the NSI. This can be an AMF Function, valid for packet switched traffic in 5GC. A usage of this performance measurement is for performance assurance or assuring the performance at the component.

Another type performance measurement used in a registration procedure related measurement includes a Number of successful mobility registration updates. This measurement provides the number of successful mobility registration updates at the AMF. The data can be collected as a by a CC on transmission by the AMF 221 to the UE 201 of Registration Accept indicating an accepted mobility registration update (see 3GPP TS 23.502 [x]). Each accepted mobility registration update is added to the relevant subcounter per NSI identifier (S-NSSAI). Each subcounter is an integer value, and can be named as: RM.RegMobSucc.SNSSAI, where SNSSAI identifies the NSI. This can be an AMF Function, valid for packet switched traffic in 5GC. A usage of this performance measurement is for performance assurance or assuring the performance at the component.

Another type performance measurement used in a registration procedure related measurement includes a Number of periodic registration update requests. This measurement provides the number of periodic registration update requests received by the AMF. The data can be collected as a by a CC on receipt by the AMF from the UE of Registration Request with the registration type indicating a Periodic Registration Update (see 3GPP TS 23.502 [x]). Each periodic registration update request is added to the relevant subcounter per NSI identifier (S-NSSAI). Each subcounter is an integer value, and can be named as RM.RegPeriodReq.SNSSAI, where SNSSAI identifies the NSI. This can be an AMF Function, valid for packet switched traffic in 5GC. A usage of this performance measurement is for performance assurance or assuring the performance at the component.

Another type performance measurement used in a registration procedure related measurement includes a Number of successful periodic registration updates. This measurement provides the number of successful mobility registration updates at the AMF. Data can be collected by a CC at the component(s) on transmission by the AMF to the UE 201 of Registration Accept indicating an accepted periodic registration update (see 3GPP TS 23.502 [x]). Each accepted periodic registration update is added to the relevant subcounter per NSI identifier (S-NSSAI). Each subcounter is an integer value, and named as RM.RegPeriodSucc.SNSSAI, where SNSSAI identifies the NSI. This can be an AMF Function, valid for packet switched traffic in 5GC. A usage of this performance measurement is for performance assurance or assuring the performance at the component.

Another type performance measurement used in a registration procedure related measurement includes a Number of emergency registration requests. This measurement provides the number of emergency registration requests received by the AMF. Data can be collected by a CC at the component(s) on receipt by the AMF from the UE 201 of Registration Request with the registration type indicating an Emergency Registration (see 3GPP TS 23.502 [x]). Each emergency registration request is added to the relevant subcounter per NSI identifier (S-NSSAI). Each subcounter is an integer value, and can be named as RM.RegEmergReq.SNSSAI, where SNSSAI identifies the NSI. This can be an AMF Function, valid for packet switched traffic in 5GC. A usage of this performance measurement is for performance assurance or assuring the performance at the component.

Another type performance measurement used in a registration procedure related measurement includes a Number of successful emergency registrations. This measurement provides the number of successful emergency registrations at the AMF. Data can be collected by a CC at the component(s) on transmission by the AMF to the UE of Registration Accept indicating an accepted emergency registration (see 3GPP TS 23.502 [x]). Each accepted emergency registration is added to the relevant subcounter per NSI identifier (S-NSSAI). Each subcounter is an integer value, and named as RM.RegEmergSucc.SNSSAI, where SNSSAI identifies the NSI. This can be an AMF Function, valid for packet switched traffic in 5GC. A usage of this performance measurement is for performance assurance or assuring the performance at the component.

In other various embodiments or aspects, performance measurements can further relate to the use case of PDU session establishment. The PDU session establishment is one of essential procedures for 5G network. The performance of PDU session establishment directly impacts the QoS of the network and the QoE of the end users. Therefore, the performance measurements are needed to be defined, set, monitored and processed to reflect the performance of the PDU session establishment.

The number and success rate of PDU session creations, the number of PDU sessions running on the SMF are some of the basic performance measurements to monitor the performance of the PDU session establishment. And the performance measurements of failed PDU session creations are helpful to solve the network issues in case of when the performance is below the expectation and a trigger can be indicated as a result or further operation processes.

A type of performance measurement used in a registration procedure for the SMF measurement includes a Number of PDU session creation requests. This measurement provides the number of PDU sessions requested to be created by the SMF. Data can be collected by a CC of the NF, and triggered on receipt by the SMF 224 from AMF 221 of Nsmf_PDUSession_CreateSMContext Request (see 3GPP TS 23.502 [x]). Each PDU session requested to be created is added to the relevant subcounter per NSI identifier (S-NSSAI) and the relevant subcounter per establishment cause. As such two different counters are utilized by the associated component. The subcounters can be an integer value, and names as SM.PduSessionCreationReqNSI.SNSSAI, where SNSSAI identifies the NSI in the first set of related subcounters, and named as SM.PduSessionCreationReqCause.cause, where the cause indicates the establishment cause for the PDU session, in a second set. This can be an SMF Function, valid for packet switched traffic in 5GC. A usage of this performance measurement is for performance assurance or assuring the performance at the component.

Another type of performance measurement used in a registration procedure for the SMF measurement includes a Number of successful PDU session creations. This measurement provides the number of PDU sessions successfully created by the SMF. Data can be collected by a CC of an NF, and triggered on transmission by the SMF to AMF of Nsmf_PDUSession_CreateSMContext Response that indicates a successful PDU session creation (see 3GPP TS 23.502 [x]). Each PDU session successfully created is added to the relevant subcounter per NSI identifier (S-NSSAI) and the relevant subcounter per establishment cause. Each subcounter or CC can be an integer value, and named SM.PduSessionCreationSuccNSI.SNSSAI, where SNSSAI identifies the NSI. This can be an SMF Function, valid for packet switched traffic in 5GC. A usage of this performance measurement is for performance assurance or assuring the performance at the component.

Another type of performance measurement used in a registration procedure for the SMF measurement includes a Number of failed PDU session creations. This measurement provides the number of PDU sessions failed to be created by the SMF. The data can be collected (or measured/determined/monitored, etc.) by a CC. On transmission by the SMF to AMF of Nsmf_PDUSession_CreateSMContext Response that indicates a rejected PDU session creation (see 3GPP TS 23.502 [x]). Each PDU session rejected to be created is added to the relevant subcounter per rejection cause. Each subcounter is an integer value, and can be called as SM.PduSessionCreationFail.cause, where cause indicates the rejection cause for the PDU session. This can be an SMF Function, valid for packet switched traffic in 5GC. A usage of this performance measurement is for performance assurance or assuring the performance at the component.

In other embodiments, or aspects, to ensure the UE properly use the services provided by 5GS, the UE needs to be associated with a policy. The policies are categorized into an AM policy and a SM policy, and are executed by AMF 221 and SMF 224 respectively. Both kinds of policies are provisioned by PCF 226. The AM policy association is to be established in case the UE 201 initially registers to the network or the UE 201 demands the AMF re-allocation. The SM policy association is to be established when the UE requests a PDU Session Establishment.

The policy association establishment includes the essential steps allowing the UE to be served by the 5GS under the designed policies, and thus is to be monitored.

A type of performance measurement used in a registration procedure for the PCF measurement includes a Number of AM policy association requests. This measurement provides the number of AM policy association requests received by the (V-)PCF. The data can be collected by a CC, and on receipt by the PCF from the AMF of Npcf_AMPolicyControl_Create (see 3GPP TS 23.502 [x]). Each AM policy association request is added to the relevant subcounter per NSI identifier (S-NSSAI). Each subcounter is an integer value, and can be named as PA.PolicyAMAssoReq.SNSSAI, where SNSSAI identifies the NSI. This can be a PCF function, value for packet switched traffic in 5GC. A usage of this performance measurement is for performance assurance or assurance the performance of a component (or communications thereof).

Another type of performance measurement used a registration procedure for the PCF measurement includes a Number of successful AM policy associations. This measurement provides the number of successful AM policy associations at the (V-)PCF. The data can be collected by a CC, and on transmission by the PCF to the AMF of Npcf_AMPolicyControl_Create response (see 3GPP TS 23.502 [x]). Each successful AM policy association is added to the relevant subcounter per NSI identifier (S-NSSAI). Each subcounter is an integer value, and named as PA.PolicyAMAssoSucc.SNSSAI, where SNSSAI identifies the NSI. This can be a PCF function, value for packet switched traffic in 5GC. A usage of this performance measurement is for performance assurance or assurance the performance of a component.

Other performance measurements (or measured parameters) of policy association can related to the SM policy. A type of such performance measurement (or measure) can include a Number of SM policy association requests. This measurement provides the number of SM policy association requests received by the PCF. The data can be collected by a CC, and on receipt by the PCF from the SMF of Npcf_SMPolicyControl_Create (see 3GPP TS 23.502 [x]). Each SM policy association request is added to the relevant subcounter per NSI identifier (S-NSSAI). Each subcounter is an integer value, and can be named as PA.PolicySMAssoReq.SNSSAI, where SNSSAI identifies the NSI (as among a plurality of NSIs). This can be a PCF function, value for packet switched traffic in 5GC. A usage of this performance measurement is for performance assurance or assurance the performance of a component.

Another type of such performance measurement (or measure) for SM policy can include a Number of successful SM policy associations. This measurement provides the number of successful SM policy associations at the PCF. The data can be collected by a CC, and on transmission by the PCF to the SMF of Npcf_SMPolicyControl_Create response (see 3GPP TS 23.502 [x]). Each successful SM policy association is added to the relevant subcounter per NSI identifier (S-NSSAI). Each subcounter is an integer value, and can be named as PA.PolicySMAssoSucc.SNSSAI, where SNSSAI identifies the NSI. This can be a PCF function, value for packet switched traffic in 5GC. A usage of this performance measurement is for performance assurance or assurance the performance of a component.

Other aspects or embodiments can include the use case of event exposure related measurements. The network events can be exposed externally as well as internally towards core network NFs via NEF 223. Some NF actions can be dependent on the monitored events. So the performance related to network event exposure needs to be monitored.

The 3GPP internal event exposure is mainly about the exposure of AMF events and exposure of UDM events. The NEF subscribes to the event exposure from AMF and UDM, and the event receiving NF (could be NEF or not) will receive the notifications for the events when the monitoring conditions are met.

The external event exposure is mainly about exposing the events occurred on 3GPP NF to AS via NEF. The AS subscribes to the event exposure from NEF, and NEF will forward the received event notifications exposed by AMF or UDM to AS. The performance measurements for AMF event exposure, UDM event exposure and external event exposure are needed to monitor the performance of event exposure.

A type of such performance measurement (or measure) for NEF can include a Number of AMF event exposure subscription requests. This measurement provides the number of AMF event exposure subscription requests sent by the NEF 223 to AMF 221. The data can be collected by a CC, and on transmission by the NEF to AMF of Namf_EventExposure_Subscribe Request (see 3GPP TS 23.502 [x]). This can be a single integer value (e.g., as by a sub-counter or the like), and named as EE.SubscriptionAmfReq. This can be an NEF function, valid for packet switched traffic in 5GC.

Another type of such performance measurement (or measure) for NEF can include a Number of successful AMF event exposure subscriptions. This measurement provides the number of successful AMF event exposure subscriptions received by the NEF from AMF. The data can be collected by a CC, and on receipt by the NEF from AMF of Namf_EventExposure_Subscribe Response indicating a successful event exposure subscription (see 3GPP TS 23.502 [x]). This can be a single integer value (e.g., as by a sub-counter or the like), and named as EE.SubscriptionAmfReq. This can be an NEF function, valid for packet switched traffic in 5GC.

Another type of such performance measurement (or measure) for NEF can include a Number of AMF event exposure notifications received. This measurement provides the number of AMF event exposure notifications received by the NEF from AMF. The data can be collected by a CC, and on receipt by the NEF from AMF of Namf_EventExposure_Notify (see 3GPP TS 23.502 [x]). This can be a single integer value (e.g., as by a sub-counter or the like), and named as EE.NotifAmfReceived. This can be an NEF function, valid for packet switched traffic in 5GC.

Another type of such performance measurement (or measure) for NEF can include a Number of UDM event exposure subscription requests. This measurement provides the number of UDM event exposure subscription requests sent by the NEF to UDM. The data can be collected by a CC, and on transmission by the NEF to UDM of Nudm_EventExposure_Subscribe Request (see 3GPP TS 23.502 [x]). This can be a single integer value (e.g., as by a sub-counter or the like), and named as EE.SubscriptionUdmReq. This can be an NEF function, valid for packet switched traffic in 5GC.

Another type of such performance measurement (or measure) for NEF can include a Number of successful UDM event exposure subscriptions. This measurement provides the number of successful UDM event exposure subscriptions received by the NEF from UDM. The data can be collected by a CC, and on receipt by the NEF from UDM of Nudm_EventExposure_Subscribe Response indicating a successful event exposure subscription (see 3GPP TS 23.502 [x]). This can be a single integer value (e.g., as by a sub-counter or the like), and named as EE.SubscriptionUdmSucc. This can be an NEF function, valid for packet switched traffic in 5GC.

Another type of such performance measurement (or measure) for NEF can include a Number of UDM event exposure notifications received. This measurement provides the number of UDM event exposure notifications received by the NEF from UDM. The data can be collected by a CC, and on receipt by the NEF from UDM of Nudm_EventExposure_Notify (see 3GPP TS 23.502 [x]). This can be a single integer value (e.g., as by a sub-counter or the like), and named as EE.NotifUdmReceived. This can be an NEF function, valid for packet switched traffic in 5GC.

Another type of such performance measurement (or measure) for NEF can include a Number of external event exposure subscription requests. This measurement provides the number of external event exposure subscription requests received by the NEF from AS. The data can be collected by a CC, and on receipt by the NEF from AS of Nnef_EventExposure_Subscribe Request (see 3GPP TS 23.502 [x]). This can be a single integer value (e.g., as by a sub-counter or the like), and named as EE.SubscriptionAsReq. This can be an NEF function, valid for packet switched traffic in 5GC.

Another type of such performance measurement (or measure) for NEF can include a Number of successful external event exposure subscriptions. This measurement provides the number of successful external event exposure subscriptions sent by the NEF to AS. The data can be collected by a CC, and on transmission by the NEF to AS of Nnef_EventExposure_Subscribe Response indicating a successful event exposure subscription (see 3GPP TS 23.502 [x]). This can be a single integer value (e.g., as by a sub-counter or the like), and named as EE.SubscriptionAsSucc. This can be an NEF function, valid for packet switched traffic in 5GC.

Another type of such performance measurement (or measure) for NEF can include a Number of external event exposure notifications sent. This measurement provides the number of external event exposure notifications sent by the NEF to AS. The data can be collected by a CC, and on transmission by the NEF to AS of Nudm_EventExposure_Notify (see 3GPP TS 23.502 [x]). This can be a single integer value (e.g., as by a sub-counter or the like), and named as EE.NotifAsSent. This can be an NEF function, valid for packet switched traffic in 5GC.

In other aspects or embodiments, the NF provides NF services to its consumers. The NF services need to be registered to NRF 225, so that the NF service consumer can discover the available NF services from NRF 225. So the successful or failed NF service registration has respect to whether the NF services can be discovered and finally used by the NF service consumer(s) (e.g., a network device, UE, gNB or other component of the network), thus the performance of the NF registration needs to be monitored A type of such performance measurement (or measure) for NRF can include a Number of NF service registration requests. This measurement provides the number of NF service registration requests received by the NRF. The data can be collected by a CC, and on receipt by the NRF from NF service consumer of Nnrf_NFManagement_NFRegister Request (see 3GPP TS 23.502 [x]). This can be a single integer value (e.g., as by a sub-counter or the like), and named as NFS.RegReq. This can be an NRF function, valid for packet switched traffic in 5GC.

A type of such performance measurement (or measure) for NRF can include a Number of successful NF service registrations. This measurement provides the number of successful NF service registrations at the NRF. The data can be collected by a CC, and on transmission by the NRF to the NF service consumer of Nnrf_NFManagement_NFRegister Response (see 3GPP TS 23.502 [x]). This can be a single integer value (e.g., as by a sub-counter or the like), and named as NFS.RegSucc. This can be an NRF function, valid for packet switched traffic in 5GC.

Figure 4:
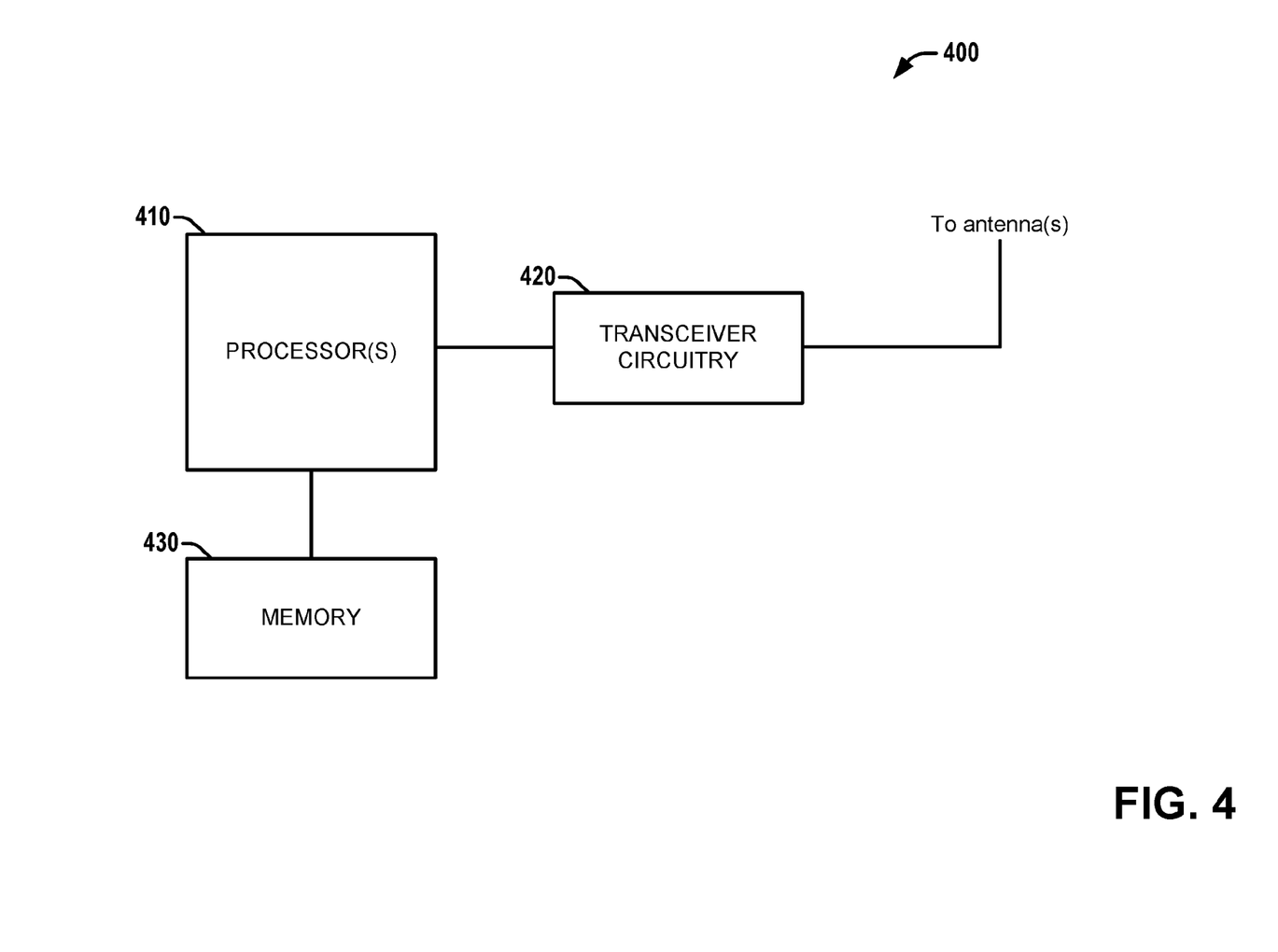
FIG. 4 is a block diagram illustrating a system employable at a UE, gNB or other network component, according to various aspects/embodiments described herein.

Referring to FIG. 4, illustrated is a block diagram of a system/device 400 employable at a UE (e.g., URLLC UEs, or non-URLLC UEs) or other network device (e.g., gNB/eNB) that facilitates one or more aspects/embodiments herein. System 400 can include one or more processors 410 (e.g., one or more baseband processors such as one or more of the baseband processors discussed in connection with the other FIGs.) comprising processing circuitry and associated interface(s), transceiver circuitry 420 (e.g., comprising part or all of RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420).

Figure 5:
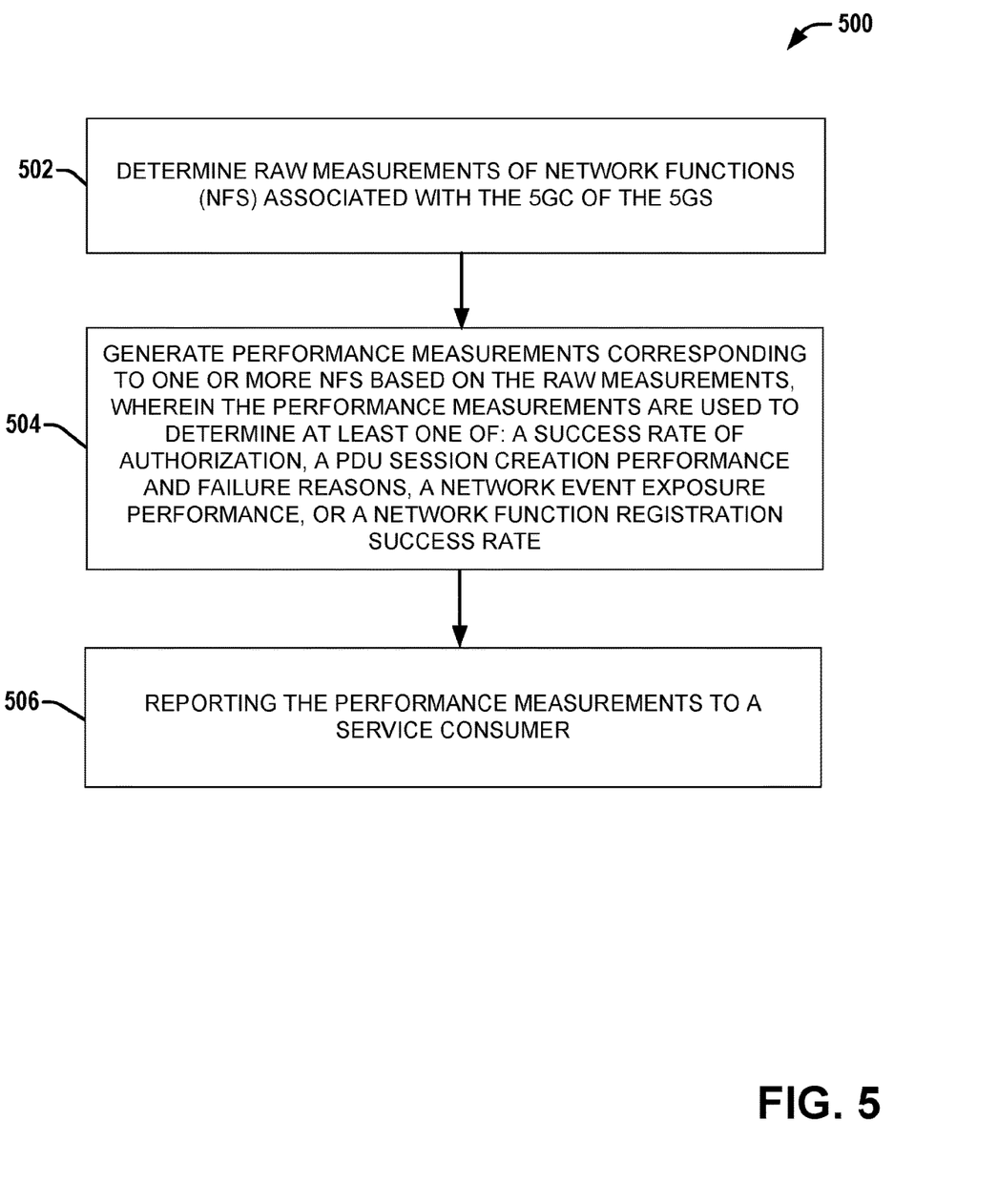
FIG. 5 is a block diagram illustrating an example process flow according to various aspects/embodiments described herein.

Referring to FIG. 5, illustrated an example process flow 500 for a network device (e.g., a user equipment (UE), a new radio NB (gNB), 5GC component or the like) can process, generate, or monitor performance parameters for network registration for a communication via a 5G network core (5GC) of a 5G network system (5GS).

At 502, the process flow includes determining raw measurements of network functions (NFs) associated with the 5GC of the 5GS.

At 504, the process flow includes generating performance measurements corresponding to one or more NFs based on the raw measurements, wherein the performance measurements are used to determine one or more of: a success rate of authorization, a PDU session creation performance and failure reasons, a network event exposure performance, or a Network Function registration success rate.

At 506, the process flow includes reporting the performance measurements to a service consumer.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

A first example is an apparatus configured to be employed in a network management component of a 5G network system (5GS) comprising: a service producer comprising one or more processors configured to: obtain raw measurements of network functions (NFs) communicatively coupled to one another via service based interfaces in a 5G core (5GC) of the 5GS; generate performance measurements corresponding to one or more NFs based on the raw measurements, wherein the performance measurements are used to determine a success rate of authorization, a PDU session creation performance and failure reasons, a network event exposure performance and a Network Function registration success rate; and report the performance measurements to a service consumer; a radio frequency (RF) interface, configured to provide, to RF circuitry, data for transmitting a communication of the report based on the performance measurements.

A second example can include the first example, wherein the one or more processors are further configured to measure the performance of registration process for an AMF component based on the performance measurements comprising one or more of: a number of initial registration requests, a number of successful initial registrations, a number of mobility registration update requests, a number of successful mobility registration updates, a number of periodic registration update requests, a number of successful periodic registration updates, a number of emergency registration requests, or a number of successful emergency registrations.

A third example can include the first or second example, wherein the performance measurements include the number of initial registration requests based on a first sub-counter per Network Slice Instance (NSI) identifier of a Single Network Slice Selection Assistance Information (S-NSSAI) associated with a number of receipts by the AMF component of a registration request, the number of successful initial registrations based on a second sub-counter associated with a number of transmissions by the AMF component of an accepted initial registration, the number of mobility registration update requests based on a third sub-counter associated with a number of Mobility Registration Updates received by the AMF component, and the number of successful mobility registration updates based on a fourth sub-counter associated with a number of accepted Mobility Registration Updates transmitted by the AMF component.

A fourth example can include any one of the first through third examples, wherein the performance measurements include the number of periodic registration update requests based on an integer value of a sub-counter associated with the number of periodic registration update requests received by the AMF component, the number of successful periodic registration updates based on another integer value of another sub-counter associated with a number of accepted periodic registration updates transmitted by the AMF component, the number of emergency registration requests based on an additional integer value of an additional sub-counter associated with a number of emergency registration requested received by the AMF component, and the number of successful emergency registrations based on a further integer value based on a further sub-counter associated with a number of accepted emergency registrations transmitted by the AMF component.

A fifth example can include any one of the first through fourth examples, wherein the one or more processors are further configured to measure the performance of Protocol Data Unit (PDU) session establishment for an SMF component based on the performance measurements comprising one or more of: a number of PDU session creation requests, a number of successful PDU session creations, or a number of failed PDU session creations.

A sixth example can include any one of the first through fifth examples, wherein the performance measurements include the number of PDU session creation requests based on integer values of first set of two sub-counters comprising a sub-counter associated with a Network Slice Instance (NSI) identifier of a Single Network Slice Selection Assistance Information (S-NSSAI) and another sub-counter associated with an establishment cause, and a number of PDU sessions creation requests received by the SMF component from the AMF component, the number of successful PDU session creations based on integer values of a second set of two sub-counters comprising a third sub-counter associated with the NSI identifier of the S-NSSAI and a fourth sub-counter associated with the establishment cause, and the number of successful PDU session creation responses transmitted by the SMF component, and the number of failed PDU session creations based on integer value of a rejection cause sub-counter associated with a number of rejection causes transmitted by the SMF component.

A seventh example can include any one of the first through sixth examples, wherein the one or more processors are further configured to measure the performance of policy association in response to receiving a request for a PDU Session Establishment for a PCF based on the performance measurements comprising one or more of: a number of Acknowledged Mode (AM) policy association requests, a number of successful AM policy associations, a number of Session Management (SM) policy association requests, or a number of successful SM policy associations.

An eighth example can include any one of the first through seventh examples, wherein the performance measurements include the number of AM policy association requests based on a first value of a first sub-counter associated with a number of receipts by the AMF component of a policy association requests for an AM policy, the number of successful AM policy associations based on a second value of a second sub-counter associated with a number of transmissions by the PCF of a successful AM policy association, the number of SM policy association requests based on a third value of a third sub-counter associated with a number of other receipts by the SMF component of a SM policy association requests for an SM policy, and the number of successful SM policy associations based on a fourth value of a fourth sub-counter associated with a number of transmission by the PCF of a successful SM policy association.

A ninth example can include any one of the first through eighth examples, wherein the one or more processors are further configured to measure the performance of event exposure to an internal or external consumer via the NEF component based on the performance measurements comprising one or more of: a number of AMF event exposure subscription requests, a number of successful AMF event exposure subscriptions, a number of AMF event exposure notifications received, a number of Unified Data Management (UDM) event exposure subscription requests, a number of successful UDM event exposure subscriptions, a number of UDM event exposure notifications received, a number of external event exposure subscription requests, a number of successful external event exposure subscriptions, or a number of external event exposure notifications sent.

A tenth example can include any one of the first through ninth examples, wherein the performance measurements include the number of AMF event exposure subscription requests, the number of successful AMF event exposure subscriptions, the number of AMF event exposure notifications received, the number of UDM event exposure subscription requests, the number of successful UDM event exposure subscriptions, the number of UDM event exposure notifications received, the number of external event exposure subscription requests, the number of successful external event exposure subscriptions, and the number of external event exposure notifications sent, each associated with a corresponding cumulative counter.

An eleventh example can include any one of the first through tenth examples, wherein the number of successful AMF event exposure subscriptions, the number of AMF event exposure notifications received, and the number of UDM event exposure subscription requests are associated with a reception from or a transmission to the AMF component, wherein the number of UDM event exposure subscription requests, the number of successful UDM event exposure subscriptions, and the number of UDM event exposure notifications received are associated with a reception from or a transmission to a UDM component communicatively coupled to the 5GC, and wherein the number of external event exposure subscription requests, the number of successful external event exposure subscriptions, and the number of external event exposure notifications sent are associated with a reception from or a transmission to an Access Stratum (AS).

A twelfth example can include any one of the first through eleventh examples, wherein the one or more processors are further configured to measure the performance of service registration for a NRF component based on the performance measurements comprising one or more of: a number of NF service registration requests, or a number of successful NF service registrations.

A thirteenth example can be an apparatus configured to be employed in a network device of a 5G network system (5GS) comprising: a service producer comprising one or more processors configured to: determine raw measurements of network functions (NFs); generate performance measurements corresponding to the one or more NFs based on the raw measurements, wherein the performance measurements are used to determine a success rate of authorization, PDU session creation performance and failure reasons, a network event exposure performance and a Network Function registration success rate; and report the performance measurements to a service consumer; a radio frequency (RF) interface, configured to provide, to RF circuitry, data for transmitting or receiving a communication of the report based on the performance measurements.

A fourteenth example can include the thirteenth example, wherein the performance measurements comprise a number of initial registration requests based on a number of receipts by an AMF of a registration request, a number of successful initial registrations based on a number of transmissions by the AMF of an accepted initial registration, a number of mobility registration update requests based on a number of Mobility Registration Updates received by the AMF, and a number of successful mobility registration updates based a number of accepted Mobility Registration Updates transmitted by the AMF, where the performance measurements are based on a plurality of cumulative counters per Network Slice Instance (NSI) identifier of a Single Network Slice Selection Assistance Information (S-NSSAI).

A fifteenth example can include a computer readable storage device storing executable instructions that, in response to execution, cause one or more processors of a network device or a next generation NodeB (gNB) of a 5G network system (5GS) to perform operations, the operations comprising: determining raw measurements of network functions (NFs) associated with a 5G core (5GC) of the 5GS; generating performance measurements corresponding to one or more NFs based on the raw measurements, wherein the performance measurements are used to determine a success rate of authorization, a PDU session creation performance and failure reasons, a network event exposure performance and a Network Function registration success rate; and reporting the performance measurements to a service consumer.

A sixteenth example includes the fifteenth example, wherein the operations further comprise: measure a performance of registration process based on the performance measurements comprising one or more of: a number of initial registration requests, a number of successful initial registrations, a number of mobility registration update requests, a number of successful mobility registration updates, a number of periodic registration update requests, a number of successful periodic registration updates, a number of emergency registration requests, or a number of successful emergency registrations.

A seventeenth example includes the sixteenth or fifteenth example, wherein the operations further comprise: controlling a Protocol Data Unit (PDU) session establishment via an SMF based on the performance measurements comprising one or more of: a number of PDU session creation requests, a number of successful PDU session creations, or a number of failed PDU session creations.

An eighteenth example includes any one of the fifteenth through seventeenth examples, wherein the operations further comprise: generating a policy association in response to receiving a request for a PDU Session Establishment via a PCF based on one or more of: a number of Acknowledged Mode (AM) policy association requests, a number of successful AM policy associations, a number of Session Management (SM) policy association requests, or a number of successful SM policy associations.

A nineteenth example includes any one of the fifteenth through eighteenth examples, wherein the operations further comprise: controlling an event exposure to an external consumer via an NEF based on: one or more of: a number of AMF event exposure subscription requests, a number of successful AMF event exposure subscriptions, a number of AMF event exposure notifications received, a number of Unified Data Management (UDM) event exposure subscription requests, a number of successful UDM event exposure subscriptions, a number of UDM event exposure notifications received, a number of external event exposure subscription requests, a number of successful external event exposure subscriptions, or a number of external event exposure notifications sent.

A twentieth example includes any one of the fifteenth through nineteenth examples, wherein the operations further comprise: monitoring a service registration via the NRF based on one or more of: a number of NF service registration requests, or a number of successful NF service registrations.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a network management component of a 5G network system (5GS) comprising:
   a service producer comprising one or more processors configured to:
   obtain raw measurements of network functions (NFs) communicatively coupled to one another via service based interfaces in a 5G core (5GC) of the 5GS;
   generate performance measurements corresponding to one or more NFs based on the raw measurements, wherein the performance measurements are used to determine one or more of a success rate of authorization, a Protocol Data Unit (PDU) session creation performance and failure reasons, a network event exposure performance, or a Network Function registration success rate;
   measure a service registration for a Network Repository Function (NRF) component based on the performance measurements comprising one or more of: a number of NF service registration requests, or a number of successful NF service registrations; and
   report the performance measurements to a service consumer; and a radio frequency (RF) interface, configured to provide, to RF circuitry, data for transmitting a communication of the report based on the performance measurements.

2. The apparatus of claim 1, wherein the one or more processors are further configured to measure a registration process for an Access and Mobility Function (AMF) component based on the performance measurements comprising one or more of: a number of initial registration requests, a number of successful initial registrations, a number of mobility registration update requests, a number of successful mobility registration updates, a number of periodic registration update requests, a number of successful periodic registration updates, a number of emergency registration requests, or a number of successful emergency registrations.

3. The apparatus of claim 2, wherein the performance measurements include the number of initial registration requests based on a first sub-counter per Network Slice Instance (NSI) identifier of a Single Network Slice Selection Assistance Information (S-NSSAI) associated with a number of receipts by the AMF component of a registration request, the number of successful initial registrations based on a second sub-counter associated with a number of transmissions by the AMF component of an accepted initial registration, the number of mobility registration update requests based on a third sub-counter associated with a number of Mobility Registration Updates received by the AMF component, and the number of successful mobility registration updates based on a fourth sub-counter associated with a number of accepted Mobility Registration Updates transmitted by the AMF component.

4. The apparatus of claim 2, wherein the performance measurements include the number of periodic registration update requests based on an integer value of a sub-counter associated with the number of periodic registration update requests received by the AMF component, the number of successful periodic registration updates based on another integer value of another sub-counter associated with a number of accepted periodic registration updates transmitted by the AMF component, the number of emergency registration requests based on an additional integer value of an additional sub-counter associated with a number of emergency registration requested received by the AMF component, and the number of successful emergency registrations based on a further integer value based on a further sub-counter associated with a number of accepted emergency registrations transmitted by the AMF component.

5. The apparatus of claim 1, wherein the one or more processors are further configured to measure a Protocol Data Unit (PDU) session establishment for an SMF component based on the performance measurements comprising one or more of: a number of PDU session creation requests, a number of successful PDU session creations, or a number of failed PDU session creations.

6. The apparatus of claim 5, wherein the performance measurements include the number of PDU session creation requests based on integer values of first set of two sub-counters comprising a sub-counter associated with a Network Slice Instance (NSI) identifier of a Single Network Slice Selection Assistance Information (S-NSSAI) and another sub-counter associated with an establishment cause, and a number of PDU sessions creation requests received by the SMF component from an AMF component, the number of successful PDU session creations based on integer values of a second set of two sub-counters comprising a third sub-counter associated with the NSI identifier of the S-NSSAI and a fourth sub-counter associated with the establishment cause, and a number of successful PDU session creation responses transmitted by the SMF component, and the number of failed PDU session creations based on integer value of a rejection cause sub-counter associated with a number of rejection causes transmitted by the SMF component.

7. The apparatus of claim 1, wherein the one or more processors are further configured to measure a policy association in response to receiving a request for a PDU Session Establishment for a Policy Control Function (PCF) based on the performance measurements comprising one or more of: a number of Acknowledged Mode (AM) policy association requests, a number of successful AM policy associations, a number of Session Management (SM) policy association requests, or a number of successful SM policy associations.

8. The apparatus of claim 7, wherein the performance measurements include the number of AM policy association requests based on a first value of a first sub-counter associated with a number of receipts by an AMF component of a policy association requests for an AM policy, the number of successful AM policy associations based on a second value of a second sub-counter associated with a number of transmissions by the PCF of a successful AM policy association, the number of SM policy association requests based on a third value of a third sub-counter associated with a number of other receipts by an SMF component of a SM policy association requests for an SM policy, and the number of successful SM policy associations based on a fourth value of a fourth sub-counter associated with a number of transmission by the PCF of a successful SM policy association.

9. The apparatus of claim 1, wherein the one or more processors are further configured to measure an event exposure to an internal or external consumer via a Network Exposure Function (NEF) component based on the performance measurements comprising one or more of: a number of AMF event exposure subscription requests, a number of successful AMF event exposure subscriptions, a number of AMF event exposure notifications received, a number of Unified Data Management (UDM) event exposure subscription requests, a number of successful UDM event exposure subscriptions, a number of UDM event exposure notifications received, a number of external event exposure subscription requests, a number of successful external event exposure subscriptions, or a number of external event exposure notifications sent.

10. The apparatus of claim 9, wherein the performance measurements include the number of AMF event exposure subscription requests, the number of successful AMF event exposure subscriptions, the number of AMF event exposure notifications received, the number of UDM event exposure subscription requests, the number of successful UDM event exposure subscriptions, the number of UDM event exposure notifications received, the number of external event exposure subscription requests, the number of successful external event exposure subscriptions, and the number of external event exposure notifications sent, each associated with a corresponding cumulative counter.

11. The apparatus of claim 10, wherein the number of successful AMF event exposure subscriptions, the number of AMF event exposure notifications received, and the number of UDM event exposure subscription requests are associated with a reception from or a transmission to an AMF component, wherein the number of UDM event exposure subscription requests, the number of successful UDM event exposure subscriptions, and the number of UDM event exposure notifications received are associated with a reception from or a transmission to a UDM component communicatively coupled to the 5GC, and wherein the number of external event exposure subscription requests, the number of successful external event exposure subscriptions, and the number of external event exposure notifications sent are associated with a reception from or a transmission to an Access Stratum (AS).

12. An apparatus configured to be employed in a network device of a 5G network system (5GS) comprising:
a service producer comprising one or more processors configured to:
determine raw measurements of network functions (NFs);
generate performance measurements corresponding to the NFs based on the raw measurements, wherein the performance measurements are used to determine one or more of a success rate of authorization, a Protocol Data Unit (PDU) session creation performance and failure reasons, a network event exposure performance, or a Network Function registration success rate;
measure a service registration for a Network Repository Function (NRF) component based on the performance measurements comprising one or more of: a number of NF service registration requests, or a number of successful NF service registrations; and
report the performance measurements to a service consumer; and
a radio frequency (RF) interface, configured to provide, to RF circuitry, data for transmitting or receiving a communication of the report based on the performance measurements.

13. The apparatus of claim 12, wherein the performance measurements comprise a number of initial registration requests based on a number of receipts by an Access and Mobility Function (AMF) of a registration request, a number of successful initial registrations based on a number of transmissions by the AMF of an accepted initial registration, a number of mobility registration update requests based on a number of Mobility Registration Updates received by the AMF, and a number of successful mobility registration updates based a number of accepted Mobility Registration Updates transmitted by the AMF, where the performance measurements are based on a plurality of cumulative counters per Network Slice Instance (NSI) identifier of a Single Network Slice Selection Assistance Information (S-NSSAI).

14. A non-transitory computer readable storage device storing executable instructions that, in response to execution, cause one or more processors of a network device or a base station of a 5G network system (5GS) to perform operations, the operations comprising:
monitoring a service registration via a Network Repository Function (NRF) based on one or more of: a number of Network Function (NF) service registration requests, or a number of successful NF service registrations;
determining raw measurements of network functions (NFs) associated with a 5G core (5GC) of the 5GS;
generating performance measurements corresponding to one or more NFs based on the raw measurements, wherein the performance measurements are used to determine one or more of a success rate of authorization, a Protocol Data Unit (PDU) session creation performance and failure reasons, a network event exposure performance, or a Network Function registration success rate; and
reporting the performance measurements to a service consumer.

15. The non-transitory computer readable storage device of claim 14, wherein the operations further comprise:
measure a performance of registration process based on the performance measurements comprising one or more of: a number of initial registration requests, a number of successful initial registrations, a number of mobility registration update requests, a number of successful mobility registration updates, a number of periodic registration update requests, a number of successful periodic registration updates, a number of emergency registration requests, or a number of successful emergency registrations.

16. The non-transitory computer readable storage device of claim 15, wherein the operations further comprise:
controlling a Protocol Data Unit (PDU) session establishment via an Session Management Function (SMF) based on the performance measurements comprising one or more of: a number of PDU session creation requests, a number of successful PDU session creations, or a number of failed PDU session creations.

17. The non-transitory computer readable storage device of claim 15, wherein the operations further comprise:
generating a policy association in response to receiving a request for a PDU Session Establishment via a PCF based on one or more of: a number of Acknowledged Mode (AM) policy association requests, a number of successful AM policy associations, a number of Session Management (SM) policy association requests, or a number of successful SM policy associations.

18. The non-transitory computer readable storage device of claim 14, wherein the operations further comprise:
controlling an event exposure to an external consumer via a Network Exposure Function (NEF) based on: one or more of: a number of Access and Mobility Function (AMF) event exposure subscription requests, a number of successful AMF event exposure subscriptions, a number of AMF event exposure notifications received, a number of Unified Data Management (UDM) event exposure subscription requests, a number of successful UDM event exposure subscriptions, a number of UDM event exposure notifications received, a number of external event exposure subscription requests, a number of successful external event exposure subscriptions, or a number of external event exposure notifications sent.

* * * * *